INVENTOR.
THOMAS D. VERTIN
BY
Donnelly, Mentag & Harrington
ATTORNEYS

Sept. 7, 1965 T. D. VERTIN 3,204,909
SUPPORT MEANS FOR CAR BODIES IN
THE MAKING OF MASTER MODELS
Original Filed March 31, 1959 5 Sheets-Sheet 3

INVENTOR.
THOMAS D. VERTIN
BY
*Donnelly, Mentag & Harrington*
ATTORNEYS

Sept. 7, 1965

T. D. VERTIN 3,204,909

SUPPORT MEANS FOR CAR BODIES IN
THE MAKING OF MASTER MODELS

Original Filed March 31, 1959

INVENTOR.
THOMAS D. VERTIN
BY
*Donnelly, Mentag & Harrington*
ATTORNEYS

INVENTOR.
THOMAS D. VERTIN

United States Patent Office 3,204,909
Patented Sept. 7, 1965

3,204,909
SUPPORT MEANS FOR CAR BODIES IN THE MAKING OF MASTER MODELS
Thomas D. Vertin, 37540 Lake Shore Drive, Mount Clemens, Mich.
Original application Mar. 31, 1959, Ser. No. 803,240, now Patent No. 3,076,231. Divided and this application Feb. 1, 1963, Ser. No. 255,432
2 Claims. (Cl. 248—346)

This invention relates generally to the art of model making, and, more particularly, to a novel and improved means for making models for the automobile industry and like industries for use in tooling up for major and minor model changeovers, mock-ups and like purposes. This application is a division of my prior co-pending application, Serial No. 803,240, filed on March 31, 1959 and entitled: Method and Means of Body Development Procedures and the Making of Master Models, now U.S. Letters Patent No. 3,076,231.

It is the primary object of the present invention to provide improved procedures for reducing the time cycle required to make master models of a new design for use in coordinating the manufacture of dies, tools and checking fixtures which are needed for the new product having the new design. Experience has shown that the costs of tooling for new products can be greatly reduced by employing the procedures embodied in the present invention. It will be seen that the invention is well adapted for use in the auto industry, but it will be understood that it is not intended that the invention be restricted to such industry since it can be used in any industry where it has utility. The procedures of the present invention can be used in the manufacture of any article having a formed body, housing or the like in which the separate parts thereof are made by forming, stamping, drawing, molding or like methods.

Heretofore, in the automotive industry, it has been common practice when producing a major or new body style to go through many preliminary time-consuming and costly steps in development engineering before a master model could be produced. This procedure has required an approximate time period of at least seven months. In sequence, after the styling illustrations are found acceptable, the shape or form is produced in miniature scale and the full-scale feasibility and styling clay model is shaped to size with prove out. From this the body surface layout draft is produced thus enabling the body designers to make a full set of drawings showing the complete surface and details of body construction. These drawings are needed to make product body drafts and templates from which a master model is made. In comparison, it is an important object of this invention to provide modeling and intermediate body development procedures which will materially reduce the time cycle required by the other prior art modeling procedures from seven months to three months.

It is an object of this invention to provide an improved novel supporting sub-structure, for use in the method of making models set forth in said co-pending application, for retaining the various body panel peripheries, highline, and character lines in their relative positions. The construction of the sub-structure can be started and built up prior to the time that the 100 percent, full-size styling clay model is completed. This diminishes the time cycle of the overall program, whereas the base of models of prior art procedures were never before mounted on the basic supporting cube at this stage of the body surface development program.

It is still another object of this invention to provide a novel sub-structure, for producing master models or patterns, which can be engineered so that all features of the models can be utilized over again except for unique, new or modified surface changes such as face lifts, and major or minor changes.

It is another object of this invention to provide a modeling procedure wherein the 100 percent styling clay model prove-out stage employed in most prior art procedures can be eliminated. This deletion of the prove-out operation is achieved through the assembly on the basic supporting cube of the various master male patterns which have their normal surfaces filled with a pliable dental wax or plastic type material that offers highlighting of the assembled body with integral surfaces and no joints exposed.

It is still another object of the present invention to provide a supporting means for an assembly of styling part models which form a complete styling model comprising, a plurality of supporting blocks disposed and arranged to approximately the general configuration of the complete styling model, and, a plurality of insert members detachably mounted on said supporting blocks with each of said insert members being adapted to carry a part of the complete styling model.

Other objects, features and advantages of this invention will be apparent from the following detailed description and appended claims, reference being had to the accompanying drawings forming a part of the specification wherein like reference numerals designate corresponding parts of the several views.

Figure 2:
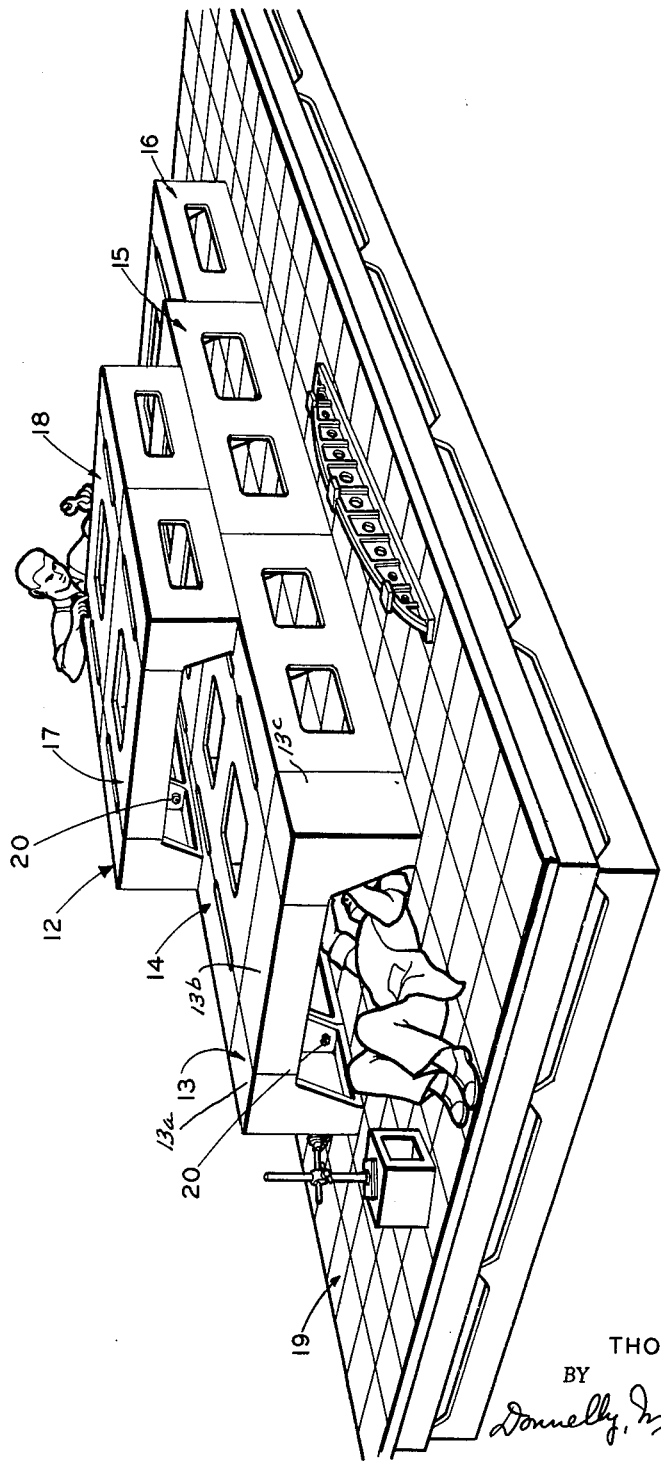
FIG. 2 is a perspective view of a basic supporting cube structure assembled, located and fixed on a surface plate.
Figure 4:
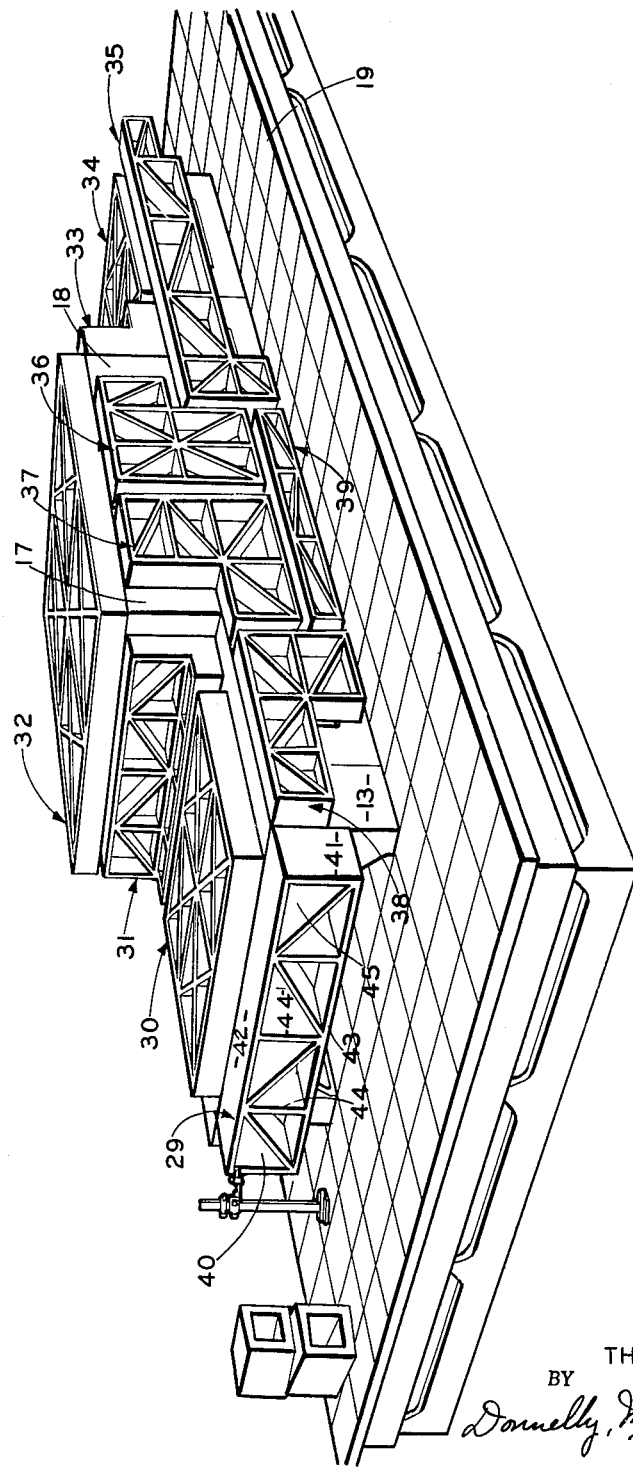
Figure 5:
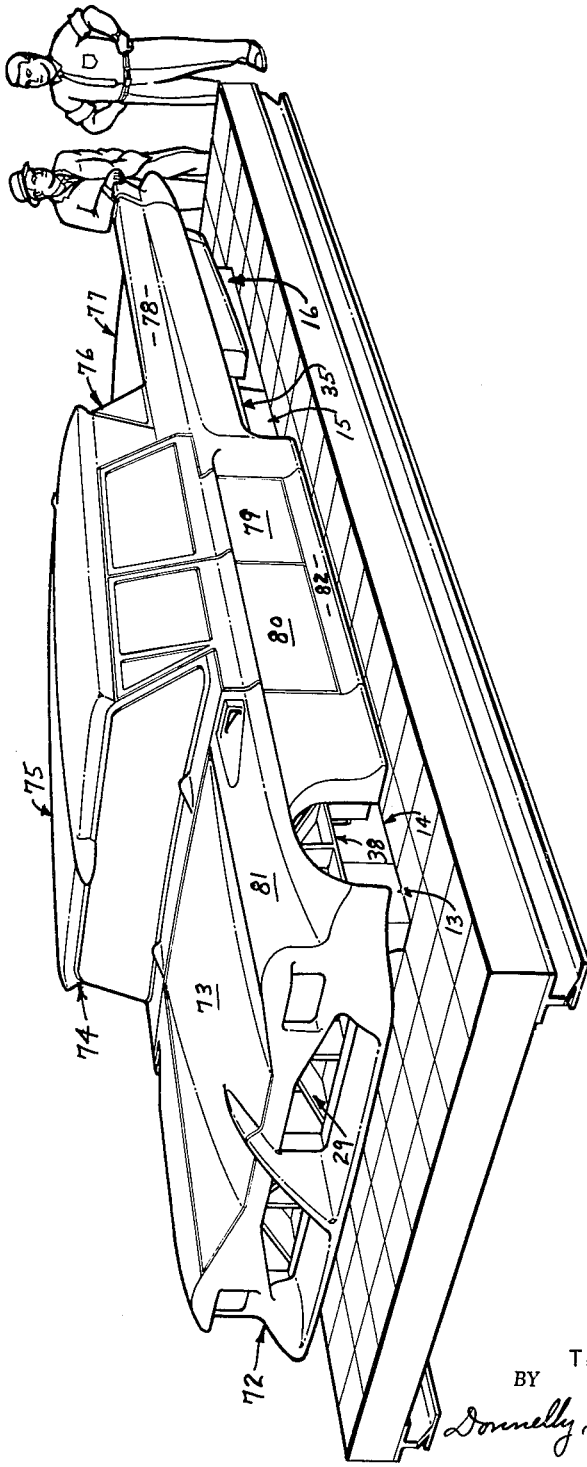

FIG. 4 is a perspective view of the basic supporting cube structure shown in FIG. 2, showing the insert sub-structure fabricated and located thereon for supporting the various panels of the automobile body; and FIG. 5 (FIG. 28 in said co-pending application) is a perspective view of the finally approved panel master models with the surface permanently completed and re-assembled on the basic supporting cube structure to provide the male master models for die manufacture and subsequent tooling.

Figure 1:
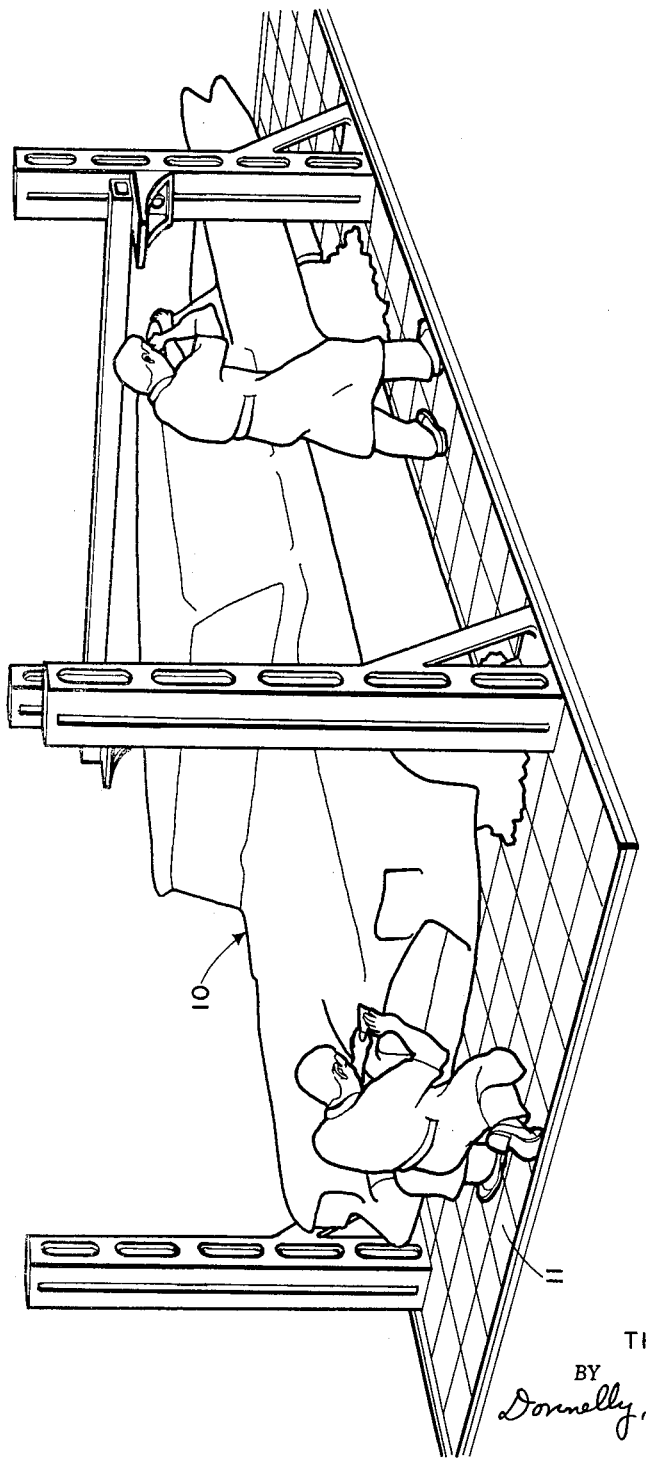
FIG. 1 is a perspective view of a full size scale clay styling model with the basic form of the vehicle being approximately 50% established or finished.

For a detailed description of the invention reference is now had to the accompanying drawings (FIG. 1) wherein the numeral 10 generally indicates a conventional styling model being made from clay and to a full size scale reproduction of a desired automobile body. The styling model 10 is made on a surface plate 11 and the clay is shaped in accordance with the styling sketches or drawings of the desired new style, by means of the usual hand methods. As shown in FIG. 1, the styling model 10 is approximately half finished, that is, the clay has been worked so that the overall size of the automobile is well established. In other words, the shaping of the clay has been approximately 50% completed so as to establish the basic form of the automobile body.

According to the method invention disclosed and claimed in my aforementioned co-pending application, when the work on the styling model has reached the point where the basic form of the car body is established by the body styling department, the first phase or step toward developing the body surface is taken. The first phase of the body surface development comprises the establishment and the assembling of the basic supporting cube on a surface plate. As shown in FIG. 2, the basic cube is generally indicated by the numeral 12 and functions as a basic supporting structure for the individual panel patterns which will form the complete body model. The basic cube 12 is preferably made from a plurality of rectangularly shaped hollow blocks including the lower layers of blocks 13, 14, 15 and 16 and the upper centrally disposed blocks 17 and 18. The upper layer of blocks 17 and 18 is obviously disposed in a position approximating the passenger compartment of the car. The rear block 16 of the lower layer is made of a less depth than blocks 13, 14 and 15, and covers the trunk area. The blocks 13, 14, 15 and 16 may be fixedly secured to the surface plate 19 by any suitable means. The blocks forming the basic cube 12 may be made from a lightweight metal as aluminum, plastic, or like materials; and they are secured together by any suitable means as by bolts and nuts generally indicated by the numerals 20. The height and length of the various blocks would be determined by the basic form of the clay model of FIG. 1, and they would be made to a size to allow for the thickness of the various pattern panels which will be supported thereon, as more fully described hereinafter. Each of the aforementioned cube blocks comprises a pair of outer or side portions as 13a and 13c which are fixedly interconnected by the center portion 13b. It will be seen that by merely changing the center portion 13b in subsequent models, the basic supporting cube could be used again and again.

Figure 3:
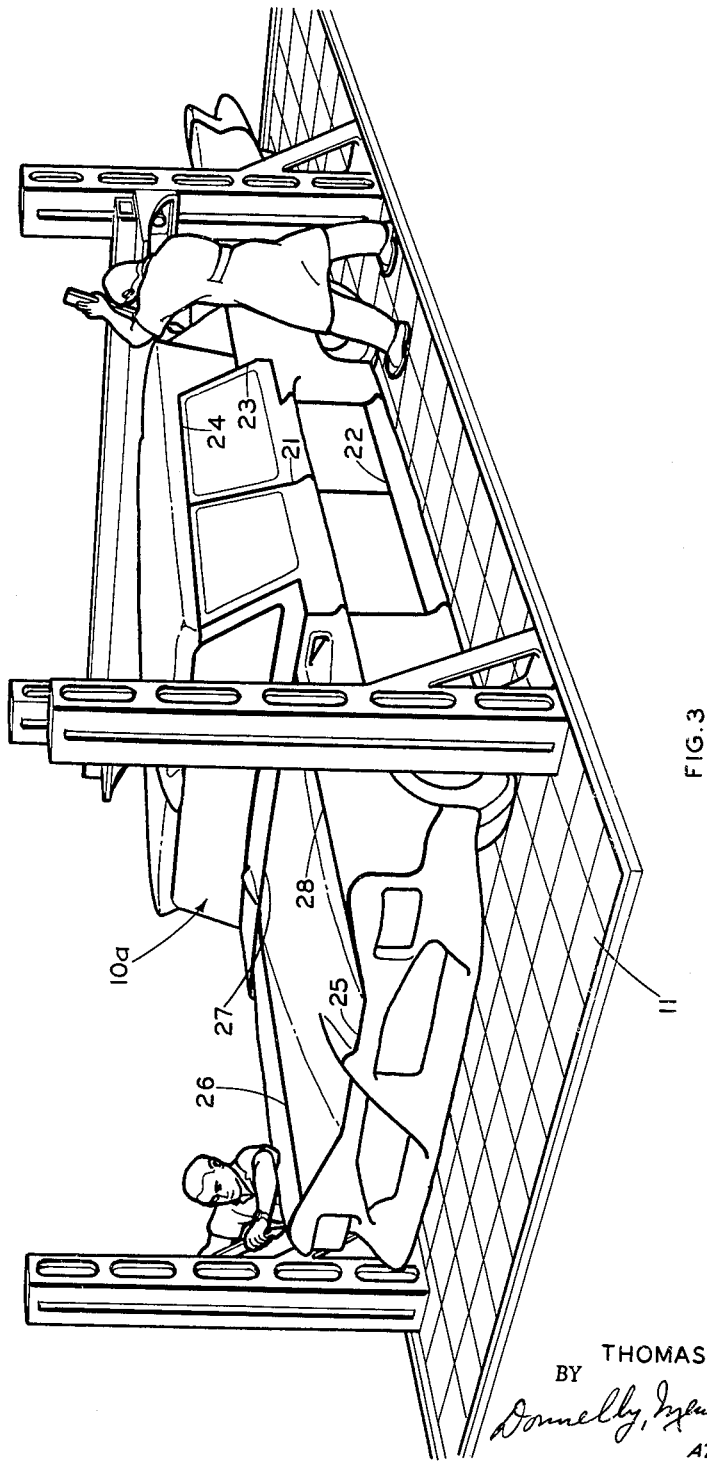
FIG. 3 is a perspective view of the full size clay styling model shown in FIG. 1, showing the clay model at the 75% completion stage with the panel peripheries being established.

During the time that the body surface development department has been making the aforedescribed basic supporting cube 12 the body styling department has continued to shape the full size scale styling clay model and when the clay model is approximately 75% completed the panel peripheries will be established as shown in FIG. 3 by the clay model 10a. For example, the periphery of the left rear door panel would be bounded by the opening lines 21, 22, 23 and 24, and, the periphery of the hood panel would be bounded by the opening lines 25, 26, 27 and 28. It will be seen that the various skin panels of the car body are marked off by the aforementioned opening lines which are scored into the clay surface of the model 10a, and phase two of the body styling procedure will be finished.

When the clay styling dummy or model 10a stage is reached by the body styling department the body surface development department can then proceed with the second phase or step of the body surface development. This second body surface development phase comprises the fabricating and locating of the insert substructures which will support or carry the various body pattern panels. These insert substructures are indicated in FIG. 4 by the numerals 29 through 39, which are adapted to support the complete set of body panels, including the following: the grille, hood, windshield, roof, back light, rear deck, rear left quarter panel or fender, rear left door, front left door, front left fender and left side panels respectively. These panel insert substructures would be shaped in accordance with the general basic form of the clay model 10a and the panels mounted thereon. The insert substructures are box shaped with an open top and bottom, that is, they would have side walls and a supporting structure to suit the periphery of the panel. For example, the substructure insert 29 comprises the end walls 40 and 41, the upper and lower walls 42 and 43, the vertical stiffening walls or standards 44, and the diagonal inter-connecting walls 45. The insert substructures may be made of wood, as plywood or plastic tubing sections or any other suitable materials and are releasably located in place on the basic supporting cube by any suitable means, as by being screwed and doweled onto the basic supporting cube 12.

During the time that the body surface development department has been making the insert substructures, the body styling department has been finishing the clay styling model to the point where the styling is 100% complete. At this point the car body clay model would be in condition for the making of reference templates therefrom as shown in FIG. 5 of said co-pending application.

FIG. 5 illustrates a complete assembly of the various male master model parts made by the modelling method disclosed and claimed in said co-pending application, on the basic supporting cube structure to provide a finished set of master male models for die manufacturing and subsequent tooling.

As shown in FIG. 5, the grille master male model is generally indicated by the numeral 72, and is mounted on the insert sub-structure 29 by any suitable means, as for example, screws, adhesive and the like. The master male models 73, 74, 75, 76, 77, 78, 79, 80, 81 and 82, which are the models for the hood, windshield, roof, back light, rear deck, rear left quarter panel, rear left door, front left door, front left fender and left side panels respectively, are mounted on the insert substructures 30 through 39, respectively. The last named male models are connected to their respective insert substructures in the same manner as the grille master male model 72. The master male models for the right side of the vehicle illustrated in FIG. 5 would also be supported on the respective right side unit substructures in the same manner as the master male models for the left side of the vehicle. It will be understood that the master male models may be made by means of the model method disclosed and claimed in said co-pending application or by any other suitable model making method.

While it will be apparent that the illustrative embodiments of the invention disclosed are well calculated to fulfill the objects above stated, it will be appreciated that the invention is susceptible to modification, variation and change without departing from the proper scope or fair meaning of the subjoined claims.

What I claim is:

1. A supporting means for an assembly of styling model parts to form a complete styling model for automobile bodies or the like comprising, a plurality of supporting blocks disposed and arranged to approximately the general configuration of a complete styling model, and, a plurality of insert members detachably mounted on said supporting blocks comprising box-shaped frame elements, each element having stiffening means disposed therewithin for adapting it to carry a part of the complete model.

2. A supporting means as defined in claim 1, wherein: each of said supporting blocks includes means for detachable connection with each other.

References Cited by the Examiner

UNITED STATES PATENTS 2,039,097   4/36   Malm _____ 211—1
2,861,331   11/58  Abell _____ 248—143 X CLAUDE A. LE ROY, *Primary Examiner.*